United States Patent [19]

Mee et al.

[11] Patent Number: 5,783,377
[45] Date of Patent: Jul. 21, 1998

[54] INFRARED ABSORBER DYES

[75] Inventors: John David Mee, Rochester, N.Y.; Colin James Gray, Harrow, United Kingdom

[73] Assignee: Eastman Kodak Company, Rochester, N.Y.

[21] Appl. No.: 708,861

[22] Filed: Sep. 4, 1996

[51] Int. Cl.⁶ .................................................. G03C 1/40
[52] U.S. Cl. ....................... 430/522; 430/584; 430/594; 430/595
[58] Field of Search ............................ 430/522, 584, 430/594, 595

[56] References Cited

U.S. PATENT DOCUMENTS

| | | | |
|---|---|---|---|
| 4,975,362 | 12/1990 | Parton et al. | 430/584 |
| 5,260,178 | 11/1993 | Harada et al. | 430/508 |

FOREIGN PATENT DOCUMENTS

| | | |
|---|---|---|
| 0 703 494 | 3/1996 | European Pat. Off. |
| 01/266536 | 10/1989 | Japan . |
| 03/039947 | 2/1991 | Japan . |
| 03/138640 | 6/1991 | Japan . |
| 03177833 | 8/1991 | Japan . |
| 03/211542 | 9/1991 | Japan . |
| 04/070741 | 3/1992 | Japan . |
| 05/303165 | 11/1993 | Japan . |
| 06/011793 | 1/1994 | Japan . |
| 08/015821 | 1/1996 | Japan . |

*Primary Examiner*—Janet C. Baxter
*Attorney, Agent, or Firm*—Edith A. Rice

[57] ABSTRACT

A photographic element having a light sensitive layer and containing a dye of the formula (I):

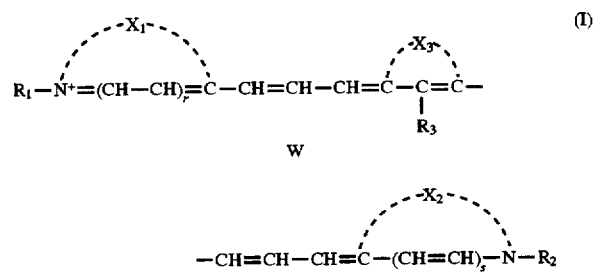

wherein:

$X_1$ and $X_2$ each independently represents the atoms necessary to complete a 5- or 6-membered heterocyclic nucleus;

$X_3$ represents the atoms necessary to form a 5- or 6-membered ring structure, which may be substituted;

$R_1$ and $R_2$ each independently represents a substituted or unsubstituted alkyl group or a substituted or unsubstituted aryl group;

$R_3$ represents H, a substituted or unsubstituted alkyl group or a substituted or unsubstituted aryl group;

r and s independently are 0 or 1; and

W represents one or more counterions as needed to balance the charge of the molecule.

20 Claims, No Drawings

INFRARED ABSORBER DYES

FIELD OF THE INVENTION

This invention relates to a photographic element containing an infrared absorber cyanine dye having a nonamethine chain.

BACKGROUND OF THE INVENTION

A wide variety of dyes is employed in photographic materials. In addition to diverse dyes used to form images in color photographic elements, spectral sensitizing dyes are used to extend the sensitivity of silver halides, which are inherently sensitive only to blue light, to other wavelengths of radiation. Dyes are also used in color photographic materials as filters, typically located in overcoats, interlayers or undercoats, to absorb incident radiation and improve image sharpness. Intergrain absorber dyes may also be added directly to a spectrally sensitized silver halide emulsion to absorb light and thereby modify the sensitivity of the emulsion.

Among the dyes commonly employed in photographic elements are the cyanines, which are discussed in T. H. James, editor, *The Theory of the Photographic Process*, 4th Edition, Macmillan, New York, 1977, Chapter 8, and in F. M. Hamer, *Cyanine Dyes and Related Compounds*, Wiley, New York, 1964. For different applications, dyes having maximum absorptions at various wavelengths are required.

A particular application of photographic elements is as photocomposition film for Graphic Arts. In such application it is important that the film be detectable inside film imagesetter, scanner, processing and other devices: if the machine cannot detect the film, then the film would be unusable. Several different detector systems are known to be used by manufacturers of graphics equipment. Of particular interest are systems which employ an infrared emitter/detector system. The infrared emitter in such systems emits infrared radiation having a wavelength in the range of 700 to 1500 nm, typically between 850 and 950 nm. For example, imagesetters or scanners fitted with red laser diode (LD) exposing sources ($\lambda$-max~670 nm) may employ detection/positioning devices operating at 880 nm. (880 nm is outside the sensitivity region of the sensitized silver halide emulsion). In this case a GaAlAs light emitting diode (LED) is employed as an emitter device: when the film is present the beam is interrupted and scattering and/or absorption can take place, thereby diminishing the amount of 880 nm radiation reaching a suitable (for example Opto Schmitt) 880 nm detector. The difference between the "film absent" and the "film present" cases causes an electrical current change to indicate the presence of the film to the imagesetter or scanner.

In such systems normally the scattering of the 880 nm radiation by the silver halide emulsion is sufficient to enable film detection. However, advances in emulsion technology have made it possible to use emulsions with grains of mean edge length of 0.18 μm or less, often referred to as "fine grain" emulsions, at silver coverages of 3.5 g Ag/m$^2$ or less. The advantage of such films are reduced scatter, giving improved image quality, and materials savings by virtue of the high covering power of fine grain emulsions at (relatively) low silver coverages. The disadvantage is that such films may not be detected by 880 nm infrared emitter/detector systems. U.S. patent application Ser. No. 08/626, 414, filed Apr. 2, 1996, entitled Cyanine Dyes With Chain Sulfone Substituent, describes a class of heptamethine cyanine dyes which, in their monomeric state, are infrared absorbers at ~880 nm in dried gelatin layers. Such dyes may be added to photographic elements to improve their 880 nm detection properties.

Another form of graphic arts equipment includes imagesetters and scanners fitted with infrared (IR) laser diode exposing sources ($\lambda$-max~780 nm), and these may employ detection devices which operate at about 935 nm. These devices utilize GaAs LED's as the emitter source together with a suitable detector. Unfortunately, the aforementioned heptamethine cyanine dyes (U.S. patent application Ser. No. 08/626,414), are poor absorbers at 935 nm and cannot be used to aid film detection at this wavelength.

Various infrared absorber dyes have been proposed for use in films to be detected in automatic processors. Dyes can be added in the form of solid particle dispersions, for example in published European Patent application EP 703, 494, and published Japanese Patent applications 03/138640, 06/011793, 08/015821 and 04/070741. Solid particle dispersions of these dyes are difficult to remove from the photographic element during processing, which is often desirable. Various other infrared absorbing dyes are disclosed in U.S. Pat. No. 5,260,178 and published Japanese Patent applications 03/039947, 03/211542, 03/177833, 01/266536 and 05/303165. For certain of these dyes, such as those disclosed in U.S. Pat. No. 5,260,178, it is necessary that they be in an aggregated state to have the desired absorption.

Aggregates that shift the light absorption band bathochromically (that is, to longer wavelengths) with respect to the monomer absorption are commonly known as J-aggregates. The use of dyes in a J-aggregated state has certain disadvantages. For example, incorporation of other components within the same layer has been observed to modify the degree of aggregation or even eliminate aggregation altogether. In addition, certain aggregated dyes can degrade the mechanical properties of the gelatin layer. Dye aggregation may also retard the rate of removal of dyes during processing, if such is desired. In order to avoid such problems, it is preferable to use dyes in their monomeric state. However, heptamethine cyanines of the type described in U.S. Pat. No. 5,260,178 have absorption maxima, in their monomeric state, at too short a wavelength to be useful for detection devices using 880 nm radiation.

Problem to be Solved by the Invention

It would therefore be desirable to provide an infrared absorber dye that, in its monomeric state, has suffcient absorption in the range of 850–950 nm so that it can be incorporated in photographic elements destined for use in equipment fitted with either GaAlAs or GaAs LED film detection devices.

SUMMARY OF THE INVENTION

The present invention provides photographic elements containing a dye of formula (I):

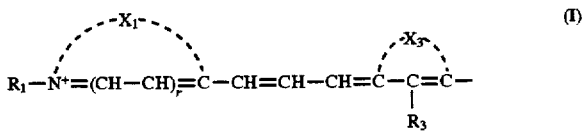

-continued

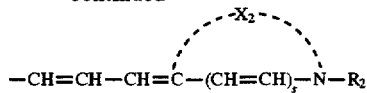

wherein:

$X_1$ and $X_2$ each independently represents the atoms necessary to complete a 5- or 6-membered heterocyclic nucleus;

$X_3$ represents the atoms necessary to form a 5- or 6-membered ring structure, which may be substituted;

$R_1$ and $R_2$ each independently represents a substituted or unsubstituted alkyl group or a substituted or unsubstituted aryl group;

$R_3$ represents H, a substituted or unsubstituted alkyl group or a substituted or unsubstituted aryl group;

r and s independently are 0 or 1; and

W represents one or more counterions as needed to balance the charge of the molecule.

ADVANTAGEOUS EFFECT OF THE INVENTION

Dyes of the above type in photographic elements have a wavelength of absorption in the range of 700 to 1500 nm. Preferred dyes have absorption maxima in the range of 850 to 950 nm. Furthermore, such dyes when appropriately substituted can be made both water soluble and non-aggregating in a gelatin coating, if desired, to assist in removal from the photographic element during processing.

EMBODIMENTS OF THE INVENTION

By reference to "under", "above", "below", "upper", "lower" or the like terms in relation to layer structure of a photographic element, is meant in this application, the relative position in relation to light when the element is exposed in a normal manner. "Above" or "upper" would mean closer to the light source when the element is exposed normally, while "below" or "lower" would mean further from the light source. Since a typical photographic element has the various layers coated on a support, "above" or "upper" would mean further from the support, while "below" or "under" would mean closer to the support. It will also be understood that reference to any broader formula includes reference to compounds with a narrower formula within the broader formula (for example, reference to a broader formula having particular substituents includes the possibility of narrower formulae following within the broader formula, having the same substituents where possible unless otherwise indicated).

Reference to a light sensitive layer or a light sensitive silver halide layer, refers to such layers which are sensitive to visible light (about 400–700 nm), ultraviolet light (about 300–400 nm) or infrared light (about 700–1500 nm).

When reference in this application is made to a particular moiety as a "group", this means that the moiety may itself be unsubstituted or substituted with one or more substituents (up to the maximum possible number). Generally, unless otherwise specifically stated, substituent groups usable on molecules herein include any groups, whether substituted or unsubstituted, which do not destroy properties necessary for the photographic utility.

In accordance with this invention, a photographic element contains an infrared absorber dye of formula (I):

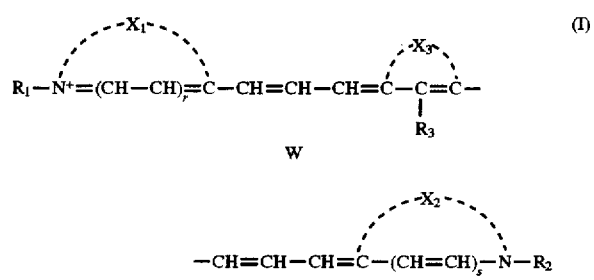

wherein:

$X_1$ and $X_2$ each independently represents the atoms necessary to complete a 5- or 6-membered heterocyclic nucleus;

$X_3$ represents the atoms necessary to form a 5- or 6-membered ring structure, which may be substituted;

$R_1$ and $R_2$ each independently represents a substituted or unsubstituted alkyl group or a substituted or unsubstituted aryl group;

$R_3$ represents H, a substituted or unsubstituted alkyl group or a substituted or unsubstituted aryl group;

r and s independently are 0 or 1; and

W represents one or more counterions as needed to balance the charge of the molecule.

In preferred embodiments of the invention the dye of formula (I) is of formula (Ia):

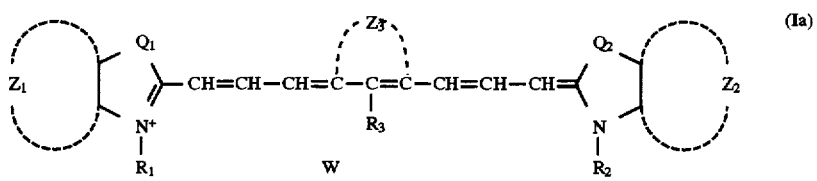

wherein:

$Z_1$ and $Z_2$ each independently represents the atoms necessary to form a substituted or unsubstituted benzene group, a substituted or unsubstituted naphthalene group or a heteroaromatic group;

$Z_3$ represents the atoms necessary to form a 5- or 6-membered ring structure, which may be substituted;

$R_1$ and $R_2$ each independently represents a substituted or unsubstituted alkyl group or a substituted or unsubstituted aryl group;

$R_3$ is H a substituted or unsubstituted alkyl group or substituted or unsubstituted aryl group;

$Q_1$ and $Q_2$ each independently represents O, S, —N($R_4$) or —C($R_5$)$_2$ where $R_4$ and $R_5$ are independently a substituted or unsubstituted alkyl group or a substituted or unsubstituted aryl group, and W represents one or more counterions as needed to balance the charge of the molecule.

In more preferred embodiments of the invention the dyes of formula (I) are of formula (Ib):

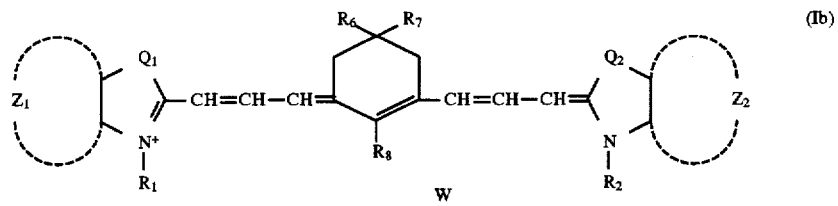

wherein:

- $Z_1$ and $Z_2$ each independently represents the atoms necessary to form a substituted or unsubstituted benzene group, a substituted or unsubstituted naphthalene group, or a heteroaromatic group;
- $R_1$ and $R_2$ each independently represents a substituted or unsubstituted alkyl group or a substituted or unsubstituted aryl group;
- $R_6$, $R_7$, $R_8$ each independently represent H, substituted or unsubstituted alkyl or substituted or unsubstituted aryl; and
- $Q_1$ and $Q_2$ independently represent O, S, $NR_4$ or —$C(R_5)_2$ where $R_4$ and $R_5$ are independently a substituted or unsubstituted alkyl group or a substituted or unsubstituted aryl group, and
- W represents one or more counterions as necessary to balance the charge of the dye.

It will be understood that when reference is given to $Z_1$ and $Z_2$ being a benzene or naphthalene group, this excludes the possibility of them having another fused aryl ring. For example, "benzene group" excludes naphthalene group, while "naphthalene group" excludes an anthracene group.

Dyes of formula (I), (Ia) and (Ib) preferably have at least two acid or acid salt groups most preferably at least 4, and possibly as high as 6 or 8. For example, $X_1$, $X_2$, $X_3$, $R_1$, and $R_2$ may each have at least one acid or acid salt group. The acid or acid salt groups include sulfo, phosphato, or phosphono. The term "acid or acid salt groups" is used to refer to the free acid groups or their corresponding salts, and does not include esters where there is no ionizable or ionized proton. Particularly preferred are the sulfo groups (for example, 3-sulfobutyl, 4-sulfobutyl, 3-sulfopropyl, 2-sulfoethyl, and the like). In preferred embodiments of the invention, $R_1$ and $R_2$ are both sulfoalkyl groups, particularly selected from the groups listed above.

The presence of at least 2 acid or acid salt groups act to increase water solubility of the dye and to inhibit aggregation.

The term "alkyl groups" includes straight, branched chain or cyclic substituted or unsubstituted alkyl groups having 1 to 20 carbon atoms, preferably 1 to 10 carbon atoms, and most preferably 1 to 6 carbon atoms. Preferred alkyl groups are methyl, ethyl, propyl, butyl, iso-butyl, t-butyl and the like.

The term "aryl groups" includes substituted or unsubstituted carbocyclic as well as substituted or unsubstituted heteroaryl groups which may have from 4 to 7 (or 5 or 6) carbon atoms, with 1, 2, 3 or 4 heteroatoms selected from O, N, or S. Examples of aromatic groups include phenyl, tolyl, naphthyl and the like. Examples of heteroaryl groups include pyridyl, thienyl, pyrrolyl, and furyl, etc.

The rings formed by $X_1$, $X_2$, $Z_1$ and $Z_2$ may be further substituted.

In the most preferred embodiments of the invention $R_6$ and $R_7$ are substituted or unsubstituted alkyl, such as methyl, and $R_8$ is H.

Examples of suitable ions for W include sodium, potassium, p-toluene sulfonate and hydrotriethylammonium.

Substituents on any of the specified groups (including any of those substituents described for $X_1$ and $X_2$, $Z_1$ and $Z_2$, $R_1$ and $R_2$) can include halogen (for example, chloro, fluoro, bromo or iodo); alkoxy (particularly 1 to 10 or 1 to 6 carbon atoms, for example, methoxy, ethoxy and the like); substituted or unsubstituted alkyl (particularly of 1 to 10 or 1 to 6 carbon atoms, for example, methyl, trifluoromethyl); amido or carbamoyl (particularly of 1 to 10 or 1 to 6 carbon atoms), alkoxycarbonyl (particularly of 1 to 10 or 1 to 6 carbon atoms); substituted and unsubstituted aryl (particularly of 1 to 10 or 1 to 6 carbon atoms, for example, phenyl or 5-chlorophenyl); heteroaryl such as those having a 5- or 6-membered ring containing 1 to 3 heteroatoms selected from N, O, or S (for example, pyridyl, thienyl, furyl or pyrrolyl, etc.); alkylthio (particularly of 1 to 10 or 1 to 6 carbon atoms, for example, methylthio or ethylthio); hydroxy or alkenyl (particularly of 1 to 10 or 1 to 6 carbon atoms); cyano; and others known in the art.

Illustrative dyes for use in the invention are:

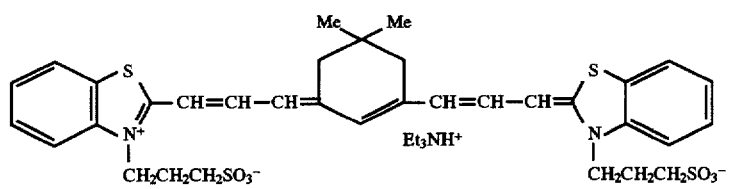

DYE I-1

-continued

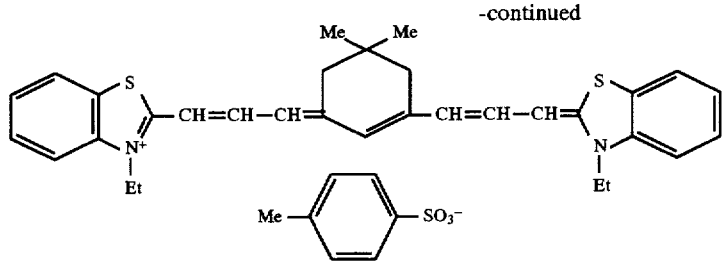
DYE I-2

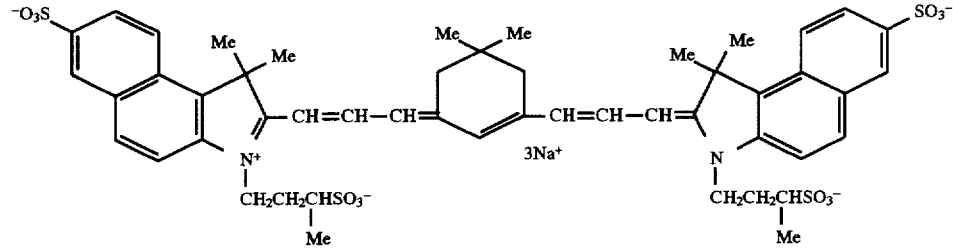
DYE I-3

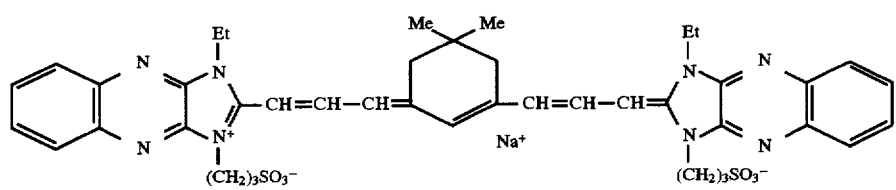
DYE I-4

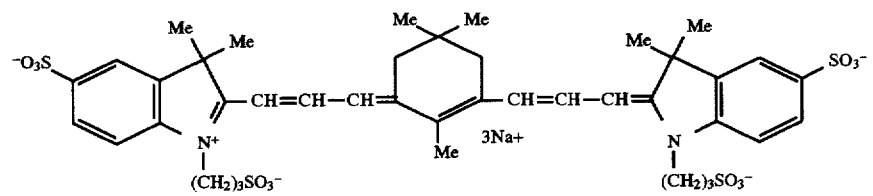
DYE I-5

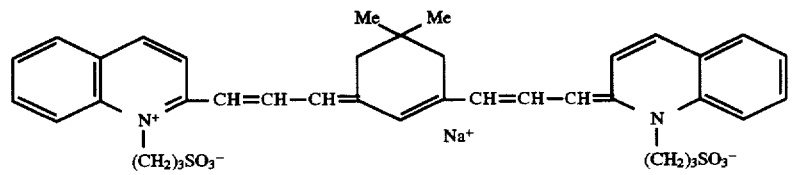
DYE I-6

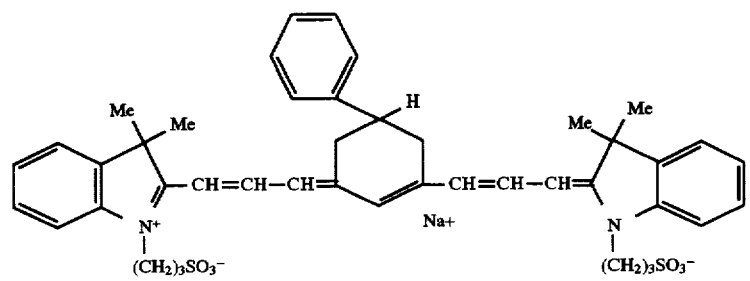
DYE I-7

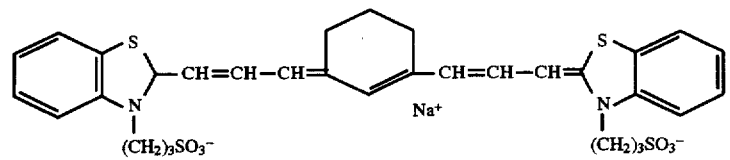
DYE I-8

In order to facilitate removal of dyes of formula (I) from photographic elements of the present invention, they are preferably present in the element in a monomeric non-aggregated state.

Formula (I) dyes may be present in a light sensitive layer of the element or a non-light sensitive layer, although preferably in a non-light sensitive layer.

The light sensitive layer preferably comprises a silver halide emulsion. The silver halide is spectrally sensitized with a spectral sensitizing dye. The spectral sensitizing dye will be a dye different from the dye of formula (I). The silver halide is sensitized with such a spectral sensitizing dye in a known manner such that the spectral sensitizing dye adsorbs to the silver halide.

The non-light sensitive layer in which the absorber dye is preferably located, may be above or below the light sensitive layer, and be on the same side of a support of the element but most preferably on the side of the support opposite to that on which the light sensitive layer is located.

Dyes of formula (I) can be prepared by using techniques such as described in F. M. Hamer, *Cyanine Dyes and Related Compounds*, Wiley, New York, 1964. The foregoing reference and all other references cited therein, are incorporated herein by reference.

Dyes of formula (I) may be provided in a layer of a photographic element by adding them to the vehicle of the layer, such as a gelatin solution, as a solution in water or an alcohol. The amount of the dye of formula (I) is preferably between 1 to 40 mg/m$^2$, more preferably 3 to 20 mg/m$^2$.

Photographic elements of the present invention will typically have at least one light sensitive silver halide emulsion layer and a support. They are preferably black and white elements such as used in Graphic Arts applications. Typically, such element will have at least 3 layers, namely a gel underlayer, the photosensitive emulsion layer and an overcoat layer, coated in that sequence on a support. A gelatin layer (often referred to as a "pelloid" layer) will also typically be provided on the side of the support opposite that on which the foregoing layers are coated. However, alternative coating formats may be employed. For example, a gel interlayer may be coated between the emulsion and overcoat and/or there is no layer between the support and the emulsion layer.

However, photographic elements of the present invention can be single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler.

Photographic elements of the present invention can also contain additional layers, such as filter layers, interlayers, overcoat layers, subbing layers, and the like.

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. No. 4,279,945 and U.S. Pat. No. 4,302,523. The element typically will have a total thickness (excluding the support) of from 5 to 30 microns.

In the following discussion of suitable materials for use in photographic elements, reference will be made to *Research Disclosure*, September 1994, Number 365, Item 36544, published by Kenneth Mason Publications, Ltd., Dudley Annex, 12a North Street, Emsworth, Hampshire PO10 7DQ, England, which will be identified hereafter by the term "*Research Disclosure I*." The Sections hereafter referred to are Sections of the *Research Disclosure I*.

The silver halide emulsions employed in the photographic elements may be negative-working, such as surface-sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

The film will preferably have silver halide grains with an average edge length of less than or equal to 0.18 μm in an amount of less than or equal to 3.5 g Ag/m$^2$. Silver halides in such films have diminishing absorption and scatter in the infrared region as the grains become smaller and, to a much lesser extent, diminishing scatter when less silver halide is coated in the emulsion layer. Hence absorber dyes of formula (I) are particularly useful in such elements where the silver halide size and coverage leads to poor detection in imagesetter devices, for example.

Supports for the photographic elements can be transparent or reflective (for example, a paper support). Such supports include polymeric films such as cellulose esters (for example, cellulose triacetate and diacetate) and polyesters of dibasic aromatic carboxylic acids with divalent alcohols (for example, poly(ethylene-terephthalate), poly(ethylene-naphthalates)), paper and polymer coated paper. Such supports are described in further detail in *Research Disclosure I*, Section XV. The preferred support for Graphic Arts elements is polyethylene terephthalate with a conventional Graphic Arts anti-halation backcoat or "pelloid" (that is, on the side of the support opposite the side upon which the light sensitive silver halide is provided) designed to absorb light of the appropriate wavelength.

The photographic elements may also contain materials that accelerate or otherwise modify the processing steps of bleaching or fixing to improve the quality of the image. Bleach accelerators described in EP 193,389; EP 301,477; U.S. Pat. No. 4,163,669; U.S. Pat. No. 4,865,956; and U.S. Pat. No. 4,923,784 are particularly useful. Also contemplated is the use of development accelerators or their precursors (UK Patent 2,097,140; UK Patent 2,131,188); electron transfer agents (U.S. Pat. No. 4,859,578; U.S. Pat. No. 4,912,025); antifogging agents such as derivatives of hydroquinones, aminophenols, amines, gallic acid; catechol; ascorbic acid; and sulfonamidophenols.

The elements may also contain filter dye layers comprising colloidal silver sol or yellow and/or magenta filter dyes, either as oil-in-water dispersions, latex dispersions or as solid particle dispersions.

The emulsions and materials to form the photographic elements may be coated on pH adjusted support as described in U.S. Pat. No. 4,917,994; with epoxy solvents (EP 0 164 961); with additional stabilizers (as described, for example, in U.S. Pat. No. 4,346,165; U.S. Pat. No. 4,540,653 and U.S. Pat. No. 4,906,559); with ballasted chelating agents such as those in U.S. Pat. No. 4,994,359 to reduce sensitivity to polyvalent cations such as calcium; and with stain reducing compounds such as those described in U.S. Pat. No. 5,068,171 and U.S. Pat. No. 5,096,805.

The silver halide emulsion used for elements of the present invention, and which is sensitized by a dye of formula (I), is preferably of the type that provides a high contrast image as required in Graphic Arts applications. Such emulsions are customarily relatively high in silver chloride and low in silver iodide. They may contain both silver bromide and silver iodide in addition to silver chloride. Preferably the iodide content of these emulsions is less than 10 mole percent. However, the preferred emulsions comprise at least 50% (most preferably 70%) chloride and less than 50% (most preferably 30%) bromide. The foregoing percentage figures are in mole percent.

As is known in the Graphic Arts field the grains may be doped with rhodium, ruthenium, iridium or other Group VIII metals, preferably at levels in the range $10^{-9}$ to $10^{-3}$, preferably $10^{-6}$ to $10^{-3}$, mole metal per mole of silver. The preferred Group VIII metal is rhodium.

The type of silver halide grains preferably include polymorphic, cubic, and octahedral. The grain size of the silver halide may have any distribution known to be useful in photographic compositions, and may be ether polydispersed or monodispersed. The silver halide emulsions employed in the photographic elements may be negative-working, such as surface-sensitive emulsions or unfogged internal latent image forming emulsions, or positive working emulsions or internal latent image forming emulsions (that are either fogged in the element or fogged during processing).

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t>8, where ECD is the diameter of a circle having an area equal to grain projected area and t is tabular grain thickness; intermediate aspect ratio tabular grain emulsions—i.e., ECD/t=5 to 8; or low aspect ratio tabular grain emulsions—i.e., ECD/t=2 to 5. The emulsions typically exhibit high tabularity (T), where T (i.e., $ECD/t^2$) >25 and ECD and t are both measured in microns ($\mu m$). The tabular grains can be of any thickness compatible with achieving an aim average aspect ratio and/or average tabularity of the tabular grain emulsion. Preferably the tabular grains satisfying projected area requirements are those having thicknesses of <0.3 $\mu m$, thin (<0.2 $\mu m$) tabular grains being specifically preferred and ultrathin (<0.07 $\mu m$) tabular grains being contemplated for maximum tabular grain performance enhancements. When the native blue absorption of iodohalide tabular grains is relied upon for blue speed, thicker tabular grains, typically up to 0.5 $\mu m$ in thickness, are contemplated.

High iodide tabular grain emulsions are illustrated by House U.S. Pat. No. 4,490,458, Maskasky U.S. Pat. No. 4,459,353 and Yagi et al EP 0 410 410.

Tabular grains formed of silver halide(s) that form a face centered cubic (rock salt type) crystal lattice structure can have either {100} or {111} major faces. Emulsions containing {111} major face tabular grains, including those with controlled grain dispersities, halide distributions, twin plane spacing, edge structures and grain dislocations as well as adsorbed {111} grain face stabilizers, are illustrated in those references cited in *Research Disclosure I*, Section I.B.(3) (page 503).

The silver halide grains may be prepared according to methods known in the art, such as those described in *Research Disclosure I* and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in *Research Disclosure I* and the references cited therein.

The photographic elements, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, ruthenium, rhodium, phosphorous, or combinations thereof. Chemical sensitization is generally carried out at pAg levels of from 5 to 10, pH levels of from 3 to 6, and temperatures of from 30° to 80° C., as described in *Research Disclosure I*, Section IV (pages 510–511) and the references cited therein.

The sensitizing dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol.

The photographic elements can be imagewise exposed using any of the known techniques for graphic arts films. Such exposure may include exposure to radiation having a wavelength of from about 400–800 nm. Exposure may be to a real image through a lens. However, exposure may be by exposure to a computer stored or generated image by means of light emitting devices (such as light controlled by light valves, CRT and the like).

The photographic elements can be processed by any known process. Processing is described in *Research Disclosure I*, Sections XIX and XX, or in T. H. James, editor, *The Theory of the Photographic Process*, 4th Edition, Macmillan, New York, 1977.

In the case of preferred Graphic Arts films, the light sensitive silver halide contained in the photographic elements is preferably processed following exposure to form a visible image, by associating the silver halide with an alkaline medium in the presence of a developing agent contained in the medium or in the element. When the photographic elements contain incorporated developing agents, the elements can be processed in the presence of an activator.

Very high contrast images can be obtained in Graphic Arts films by processing at pH values in the range 11 to 12.3, but preferably lower pH values, for example below 11 and most preferably in the range 10.3 to 10.5 are employed for processing the photographic recording materials as described herein.

The developers for the preferred Graphic Arts films are typically aqueous solutions, although organic solvents, such as diethylene glycol, can also be included to facilitate the solvency of organic components. The developers contain one or a combination of conventional developing agents, such as polyhydroxybenzene, aminophenol, para-phenylenediamine, ascorbic acid, pyrazolidone, pyrazolone, pyrimidine, dithionite, hydroxylamine, or other conventional developing agents.

It is preferred when processing the preferred Graphic Arts films constructed according to the present invention, to use hydroquinone and 3-pyrazolidone developing agents in combination. The pH of the developers can be adjusted with alkali metal hydroxides and carbonates, borax and other basic salts. To reduce gelatin swelling during development, compounds such as sodium sulfate can be incorporated into the developer. Also, compounds such as sodium thiocyanate can be present to reduce granularity. Chelating and sequestering agents, such as ethylenediaminetetraacetic acid or its sodium salt, can be present. Generally, any conventional developer composition suitable for Graphic Arts films, can be employed in processing the preferred Graphic Arts films of this invention. Specific illustrative photographic developers are disclosed in the *Handbook of Chemistry and Physics*, 36th Edition, under the title "Photographic Formulae" at page 3001 et seq. and in *Processing Chemicals and Formulae*, 6th Edition, published by Eastman Kodak Company (1963). Graphic Arts elements can, of course, be processed with conventional developers for lithographic photographic elements, as illustrated by U.S. Pat. No. 3,573,914 and UK Patent No. 376,600.

Further details on the construction and processing of Graphic Arts elements of the present type, can be found in U.S. Pat. No. 4,975,354. However, as already described, elements of the present invention must have a light sensitive silver halide emulsion and must also contain a layer including a dye of formula (I).

The present invention is further described in the following examples.

EXAMPLE 1

Preparation of Dye I-1

Anhydro-2-methyl-3-(3-sulfopropyl) benzothiazolium hydroxide (5.42 g) and Intermediate A (3.79 g) were mixed in acetonitrile (150 mL). Acetic anhydride (2.04 g) and triethylamine (4.04 g) were added and the mixture was heated in an oil-bath at 50° C., with magnetic stirring, for 1.25 hours. During this period the dye separated as the triethylamine salt. This salt was collected, dried, and dissolved in methanol. Upon addition of a solution of sodium acetate (0.82 g) in methanol, the sodium salt of the dye separated and was recrystallized from acetonitrile.

λmax (MeOH) 889 nm. εmax $17.3 \times 10^4$.

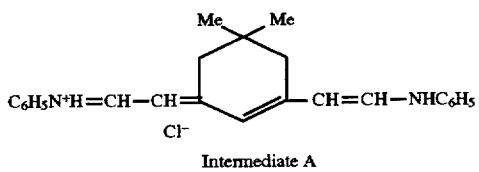

Intermediate A

EXAMPLE 2

Preparation of Dye I-2

The iodide salt of this dye was prepared, in the manner described above, from 3-Ethyl-2 methylbenzothiazolium iodide (3.05 g) and Intermediate A (1.90 g) and purified by recrystallization from methanol. The iodide salt was heated at 100° C. with excess methyl p-toluenesulfonate for 30 min. After cooling, ether was added to precipitate the p-toluenesulfonate salt of the dye. This was recrystallized from methanol.

Yield 1.22 g. λmax (MeOH) 884 nm. εmax $18.0 \times 10^4$.

EXAMPLE 3

Preparation of Dye I-3

Anhydro-1,1,2-trimethyl-7-sulfo-3-(3-sulfobutyl)benz[e]indolium hydroxide (21.3 g) and Intermediate A (9.5 g) were mixed in acetonitrile (600 mL). Acetic anhydride (5.1 g) and triethylamine (13.9 g) were added and the mixture stirred and warmed at 50° C. for 1.5 hours. The resulting solution was cooled to room temperature and a solution of sodium iodide (20 g) in acetonitrile was added, whereupon the sodium salt of the dye separated. The dye was collected and washed with acetonitrile. After recrystallization from 1:1 aqueous methanol, 8.06 g of purified dye was obtained.

λmax (MeOH) 903 nm. εmax $27.2 \times 10^4$.

Photographic Evaluation

The following absorber dyes are used in these examples.

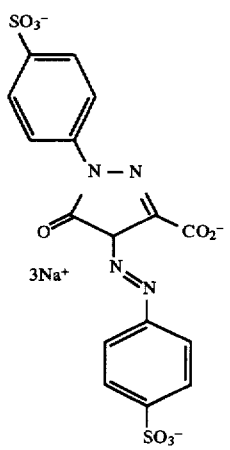
ABS1
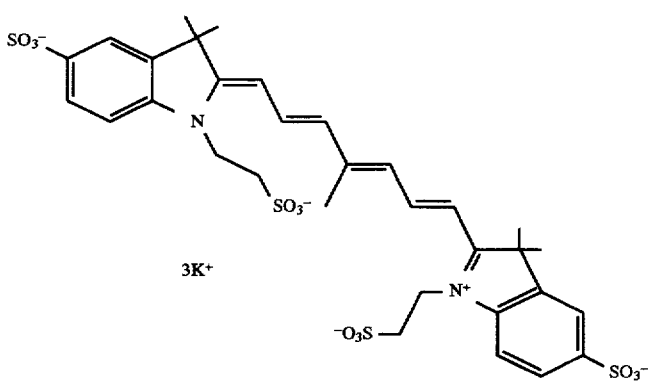
ABS2
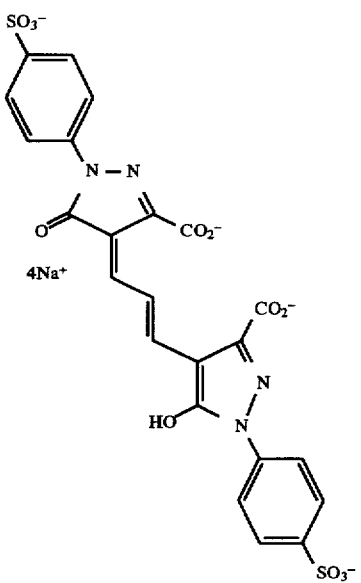
ABS3

-continued

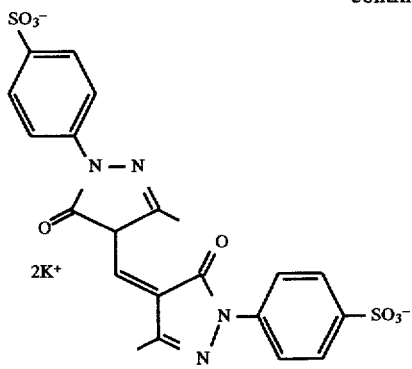

ABS4

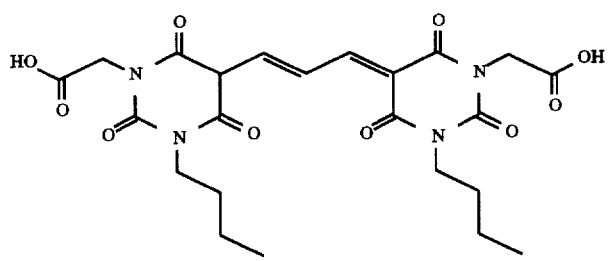

ABS5

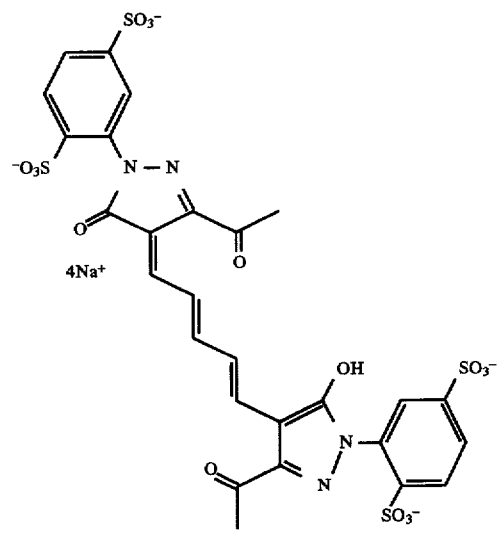

ABS6

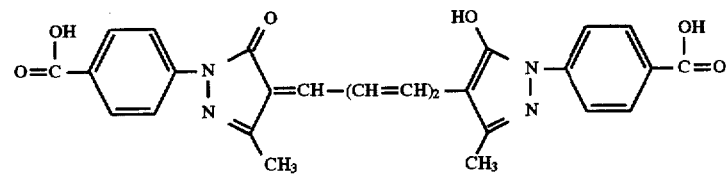

ABS7

EXAMPLE 4
Preparation of Pelloids for Use in Infrared Sensitive Films.

A series of typical pelloid layers was coated on a non-conductive polyethylene terephthalate film base, incorporating Dye I-3 at coverages of 0, 6, 12, 18, and 24 mg/m$^2$ (pelloid layers 1 to 5, respectively). Each pelloid layer also incorporated the three absorber dyes ABS1, ABS2 and ABS3 at coverages of 129, 40 and 109 mg/m$^2$, respectively. The purpose of these soluble dyes was to provide antihalation protection, safelight protection, UV protection, front-to-back recognition, etc. The pelloid layer had a total gelatin content of 3.0 g dry gelatin/m$^2$, and was simultaneously overcoated with a supercoat with a gelatin coverage of 0.488 g dry gelatin/m$^2$. The supercoat contained matting beads, lubricants and surfactants to aid coating. The whole pelloid side layers were hardened with bis(vinylsulfonyl)methane at 4.5% of the total dry gelatin.

The absorptance (A) of the pelloids at 935, 920 and 880 nm was calculated from measurements of the transmittance (T) and reflectance (R), where $A=1-(R+T)$, and expressed as a percentage. The results are shown in Table 1.

TABLE 1

Absorptance characteristics, at specified wavelengths, of Dye I-3 coated in pelloids suitable for IR photocomposition films

| Identification | Dye I-3 (mg/m$^2$) | Absorptance (%) at 935 nm | Absorptance (%) at 920 nm | Absorptance (%) at 880 nm |
|---|---|---|---|---|
| Pell 1 | 0 | −0.7 | −0.1 | −1.2 |
| Pell 2 | 6 | 8.5 | 9.8 | 6.1 |
| Pell 3 | 12 | 19.3 | 22.5 | 14.6 |
| Pell 4 | 18 | 29.5 | 33.3 | 22.1 |
| Pell 5 | 24 | 37.8 | 42.4 | 31.3 |

NOTE:
935 and 880 nm were selected for tabulation so as to match the emissions from GaAs and GaAlAs LED's, respectively 920 nm is at, or close to, the λ-max of Dye I-3 in dried gelatin layers.

The data in Table 1 show that absorption between 935 and 880 nm increases as the level of Dye I-3 in the pelloid layer is increased. It will be noted that the dye is clearly useful for incorporation in films likely to encounter detection/positioning devices operating at 880 or 935 nm.

EXAMPLE 5
Preparation of Films for Use in IR Imagesetter/Scanner Devices.

The usefulness of Dye I-3 is further illustrated by the following example. Consider the following two films, designed for exposure in imagesetters and scanners fitted with infrared laser diode exposure sources emitting at 780 nm (Table 2).

TABLE 2

Characteristics of Infrared Sensitive Imagesetter/Scanner Films

| Identification | Base | Ag laydown (g/m$^2$) | Mean Grain Edge Length | Abs (%) at 935 nm | Ref (%) at 935 nm | Trs (%) at 935 nm |
|---|---|---|---|---|---|---|
| Film 1 | Non Conductive | 3.78 | 0.22 µm | −0.1 | 30.7 | 69.4 |
| Film 2 | Conductive | 3.00 | 0.15 µm | 7.2 | 15.4 | 77.3 |

NOTE: Abs = absorptance; Ref = reflectance; Trs = transmittance

Whereas Film 1 was always detected by IR scanner equipment fitted with GaAs LED detection devices operating at about 935 nm, Film 2 could not be relied upon to be detected. It will be noted from Table 2 that Film 1 allowed no more than 70% of the incident 935 nm radiation to be transmitted to a detector device, whereas Film 2 allowed 77% transmittance. The remaining radiation was either scattered (note the reduction caused by the smaller grain size and lower silver laydown), or absorbed. The absorption in Film 2 is a feature of the conductive support used.

Thus, in order to make film product of the Film 2 type detectable, a further 8% or so of the incident 935 nm radiation needs to be scattered or absorbed. Hence, the potential usefulness of dyes like Dye I-3. This is illustrated in Table 3 below, where the Film 2 silver halide emulsion layers were coated on the prepared pelloid samples Pell 1 to 5, so as to make Film samples 3 to 7, respectively.

TABLE 3

Characteristics of IR Film Samples Where the Pelliod Layer Contained Dye I-3

| Identification | Dye I-3 laydown (mg/m$^2$) | Absorptance (%) at 935 nm | Reflectance (%) at 935 nm | Transmittance (%) at 935 nm |
|---|---|---|---|---|
| Film 3 | 0 (Pell 1) | −0.2 | 15.6 | 84.6 |
| Film 4 | 6 (Pell 2) | 13.7 | 12.0 | 74.4 |
| Film 5 | 12 (Pell 3) | 25.1 | 10.6 | 64.3 |
| Film 6 | 18 (Pell 4) | 34.6 | 9.7 | 55.7 |
| Film 7 | 24 (Pell 5) | 42.2 | 9.1 | 48.8 |

NOTE:
The silver laydown was 3.00 g Ag/m$^2$ and the mean grain edge length was 0.15 µm. The film base was non-conductive.

The data indicates that Film 5 has the qualities required for detection (≦70% transmittance), i.e., a level of only 12 mg Dye I-3/m$^2$ needs to be incorporated in the film sample in order to make it detectable.

EXAMPLE 6
Preparation of Pelloids for Use in Infrared Sensitive Films— Coatings on Conductive Support It will be appreciated from Example 5 that if the experimental film coatings had been made on film support of the conductive type (as used in Film 2), then the level of Dye I-3 required would have been lower because of the inherent absorption characteristics of this type of base. This is confirmed by the data presented in this Example.

A series of typical pelloid layers was coated on a conductive polyethylene terephthalate film base, incorporating Dye I-3 at coverages of 0, 3, 6, 9, 12, 15 and 18 mg/m$^2$ (pelloid layers 6 to 12, respectively). In all other ways the pelloids were identical to the pelloids of Example 4. As before, the absorptance (A) of the coatings at 935, 920 and 880 nm was calculated from measurements of the transmittance (T) and reflectance (R), where A=1−(R+T), and expressed as a percentage. The results are shown in Table 4.

TABLE 4

Absorptance Characteristics, at Specified Wavelengths, of Dye I-3 Coated in Pelloids (on conductive base) Suitable for IR Photocomposition Films

| Identification | Dye I-3 (mg/m$^2$) | Absorptance (%) at 935 nm | Absorptance (%) at 920 nm | Absorptance (%) at 880 nm |
|---|---|---|---|---|
| Pell 6 | 0 | 3.8 | 3.6 | 3.2 |
| Pell 7 | 3 | 7.7 | 7.7 | 7.2 |
| Pell 8 | 6 | 12.9 | 13.8 | 9.7 |
| Pell 9 | 9 | 17.8 | 19.3 | 12.8 |
| Pell 10 | 12 | 22.6 | 25.0 | 17.1 |

TABLE 4-continued

Absorptance Characteristics, at Specified Wavelengths, of Dye I-3 Coated in Pelloids (on conductive base) Suitable for IR Photocomposition Films

| Identification | Dye I-3 (mg/m$^2$) | Absorptance (%) at 935 nm | Absorptance (%) at 920 nm | Absorptance (%) at 880 nm |
|---|---|---|---|---|
| Pell 11 | 15 | 27.5 | 30.5 | 20.1 |
| Pell 12 | 18 | 30.9 | 34.5 | 23.8 |

Note:
935 and 880 nm were selected for tabulation so as to match the emissions from GaAs and GaAlAs LED's, respectively. 920 nm is at, or close to, the λ-max of Dye I-3 in dried gelatin layers.

The Film 2 silver halide emulsion layers were then coated on the prepared pelloid samples Pell 6 to 12, so as to make Film samples 8 to 14, respectively (Table 5).

TABLE 5

Characteristics of IR Film Samples Where the Pelloid Layer Contained Dye I-3

| Identification | Dye I-3 (mg/m$^2$) | Absorptance (%) at 935 nm | Reflectance (%) at 935 nm | Transmittance (%) at 935 nm |
|---|---|---|---|---|
| Film 8 | 0 (Pell 6) | 9.1 | 13.3 | 77.7 |
| Film 9 | 3 (Pell 7) | 14.9 | 12.0 | 73.1 |
| Film 10 | 6 (Pell 8) | 20.7 | 11.0 | 68.3 |
| Film 11 | 9 (Pell 9) | 25.2 | 10.6 | 64.3 |
| Film 12 | 12 (Peel 10) | 29.5 | 10.1 | 60.4 |
| Film 13 | 15 (Pell 11) | 34.0 | 9.8 | 56.2 |
| Film 14 | 18 (Pell 12) | 37.2 | 9.6 | 53.2 |

Note:
The silver laydown was 3.00 g Ag/m$^2$ and the mean grain edge length was 0.15 μm. The film base was conductive.

The data indicate that Film 10 has the qualities required for detection (≦70% transmittance) in graphics equipment fitted with GaAs LED's operating at 935 nm. In this case a level of only 6 mg Dye I-3/m$^2$ needs to be incorporated in the film sample in order to make it detectable.

EXAMPLE 7
Preparation of Pelloids For Use in Red Laser Diode Sensitive Films

A series of typical pelloid layers was coated on a non-conductive polyethylene terephthalate film base incorporating Dye I-3 at coverages of 0, 6, 12, 18 and 24 mg/m$^2$ (pelloid layers 13 to 17, respectively). Each pelloid layer also incorporated the four absorber dyes ABS3, ABS4, ABS5 and ABS6 at coverages of 202.4, 304.5, 28.0 and 187.5 mg/m$^2$, respectively. The purpose of these soluble dyes was to provide antihalation protection, safelight protection, UV protection, front-to-back recognition, etc. In another set of five coatings (pelloid layers 18 to 22) the four soluble dyes were replaced with a single absorber dye ABS7 incorporated as a solid particle dispersion at a dye coverage of 200 mg/m$^2$. The pelloid layer had a total gelatin content of 3.0 g dry gelatin/m$^2$, and was simultaneously overcoated with a supercoat with a gelatin coverage of 0.488 g dry gelatin/m$^2$. The supercoat contained matting beads, lubricants and surfactants to aid coating. The whole pelloid side layers were hardened with bis(vinylsulfonyl)methane at 4.5% by weight of the total dry gelatin.

The absorptance (A) of the pelloids at 935, 920 and 880 nm was calculated from measurements of the transmittance (T) and reflectance (R), where A=1−(R+T), and expressed as a percentage. The results are shown in Table 6.

TABLE 6

Absorptance Characteristics, at specified Wavelenghts, of Dye I-3 Coated In Pelloids Suitable for Red Laser Diode Photocomposition Films

| Identification | Dye I-3 (mg/m$^2$) | Absorptance (%) at 935 nm | Absorptance (%) at 920 nm | Absorptance (%) at 880nm |
|---|---|---|---|---|
| Pell 13 | 0 | −0.6 | −0.2 | 0.2 |
| Pell 14 | 6 | 11.8 | 12.5 | 7.3 |
| Pell 15 | 12 | 24.3 | 25.6 | 15.1 |
| Pell 16 | 18 | 35.1 | 36.6 | 21.9 |
| Pell 17 | 24 | 43.7 | 45.8 | 29.5 |
| Pell 18 | 0 | 0.5 | 0.3 | 1.0 |
| Pell 19 | 6 | 14.7 | 16.4 | 10.8 |
| Pell 20 | 12 | 25.3 | 28.5 | 19.8 |
| Pell 21 | 18 | 33.9 | 38.4 | 27.1 |
| Pell 22 | 24 | 41.5 | 46.5 | 34.9 |

NOTE:
935 and 880 nm were selected for tabulation so as to match the emissions from GaAs and GaAlAs LED's, respectively. 920 nm is at, or close to, the λ-max of Dye I-3 in dried gelatin layers. (Pelloid samples 13 to 17 also contained four soluble absorber dyes, pelloid samples 18 to 22 also contained a single solid particle absorber dye).

The data in Table 6 show that absorption between 935 and 880 nm increases as the level of Dye I-3 in the pelloid layer is increased. It will be noted that the dye is clearly useful for incorporation in films likely to encounter detection/positioning devices operating at 880 or 935 nm.

EXAMPLE 8
Preparation of Films for Use in Red Laser Diode Imagesetter/Scanner Devices.

The usefulness of Dye I-3 is further illustrated by the following example. Consider the following two films, designed for exposure in imagesetters and scanners fitted with red laser diode exposure sources emitting at about 670 nm (Table 7).

TABLE 7

Characteristics of Red Laser Diode Sensitive Imagesetter/Scanner Films

| Identification | Base | Ag laydow (g/m$^2$) | Mean Grain Edge Length | Abs (%) at 880 nm | Ref (%) at 880 nm | Trs (%) at 880 nm |
|---|---|---|---|---|---|---|
| Film 15 | non-conductive | 3.30 | 0.18 μm | 0.5 | 24.7 | 74.8 |

TABLE 7-continued

Characteristics of Red Laser Diode Sensitive Imagesetter/Scanner Films

| Identification | Base | Ag laydow ($g/m^2$) | Mean Grain Edge Length | Abs (%) at 880 nm | Ref (%) at 880 nm | Trs (%) at 880 nm |
|---|---|---|---|---|---|---|
| Film 16 | non-conductive | 2.81 | 0.15 μm | 0.2 | 20.4 | 79.3 |

NOTE:
Abs = absorptance, Ref = reflectance, Trs = transmittance.

Whereas Film 15 was always detected by LD imagesetter equipment fitted with GaAlAs LED detection devices operating at about 880 nm, Film 16 could not be relied upon to be detected. It will be noted from Table 7 that Film 15 allowed no more than 75% of the incident 880 nm radiation to be transmitted to a detector device, whereas Film 16 allowed about 80% transmittance. The remaining radiation was mostly scattered (note the reduction caused by the smaller grain size and lower silver laydown in Film 16).

Thus, in order to make film product of the Film 16 type detectable, a further 5% or so of the incident 880 nm radiation needs to be scattered or absorbed. Hence, the potential usefulness of dyes like Dye I-3. This is illustrated in Table 8 below, where the Film 16 silver halide emulsion layers were coated on the prepared pelloid samples Pell 13 to 22, so as to make Film samples 17 to 26, respectively.

TABLE 8

Characteristics of LD Film Samples Where the Pelloid Layer Contained Dye I-3

| Identification | Dye I-3 ($mg/m^2$) | Absorptance (%) at 935 nm | Absorptance (%) at 920 nm | Absorptance (%) at 880 nm |
|---|---|---|---|---|
| Film 17 | 0 (Pell 13) | 0.0 | 16.5 | 83.5 |
| Film 18 | 6 (Pell 14) | 12.6 | 13.8 | 73.6 |
| Film 19 | 12 (Pell 15) | 21.4 | 12.4 | 66.2 |
| Film 20 | 18 (Pell 16) | 28.6 | 11.5 | 59.9 |
| Film 21 | 24 (Pell 17) | 36.3 | 9.9 | 53.8 |
| Film 22 | 0 (Pell 18) | 1.3 | 18.1 | 80.6 |
| Film 23 | 6 (Pell 19) | 17.8 | 12.7 | 69.5 |
| Film 24 | 12 (Pell 20) | 26.1 | 12.0 | 61.9 |
| Film 25 | 18 (Pell 21) | 33.1 | 11.3 | 55.6 |
| Film 26 | 24 (Pell 22) | 40.8 | 9.7 | 49.5 |

NOTE:
The silver laydown was 2.81 g Ag/$m^2$ and the mean grain edge length was 0.15 μm. The film base was non-conductive.

The data indicate that Film 18 (for the soluble dye pelloid case) and Film 23 (for the solid particle dye pelloid) both have the qualities required for detection ($\leq 75\%$ transmittance) as judged by the data in Table 7. In other words, no more than 6 mg dye I-3/$m^2$ needs to be incorporated in these film samples in order to ensure detection.

While the invention has been described in detail with particular reference to preferred embodiments, it will be understood that variations and modifications can be effected within the spirit and scope of the invention.

We claim:

1. A photographic element having a light sensitive layer and which element contains a dye of the formula (I):

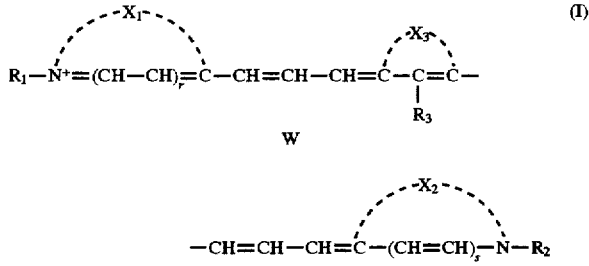

wherein:

$X_1$ and $X_2$ each independently represents the atoms necessary to complete a 5- or 6-membered heterocyclic nucleus;

$X_3$ represents the atoms necessary to form a 5- or 6-membered ring structure, which may be substituted;

$R_1$ and $R_2$ each independently represents a substituted or unsubstituted alkyl group or a substituted or unsubstituted aryl group;

$R_3$ represents H, a substituted or unsubstituted alkyl group or a substituted or unsubstituted aryl group;

r and s independently are 0 or 1; and

W represents one or more counterions as needed to balance the charge of the molecule;

and wherein said dye is water soluble and contains at least two acid groups selected from sulfo, phosphato and phosphono groups.

2. A photographic element according to claim 1, wherein the dye of formula (I) is of formula (Ia):

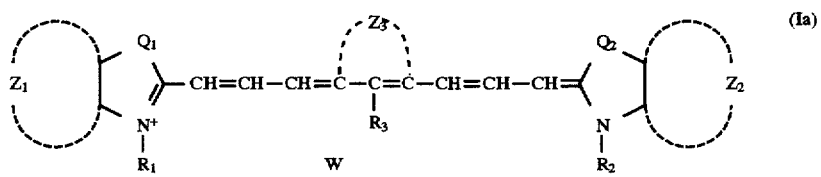

wherein:

Z₁ and Z₂ each independently represents the atoms necessary to form a substituted or unsubstituted benzene group, a substituted or unsubstituted naphthalene group or a heteroaromatic group;

Z₃ represents the atoms necessary to form a 5- or 6-membered ring structure, which may be substituted;

R₁ and R₂ each independently represents a substituted or unsubstituted alkyl group or a substituted or unsubstituted aryl group;

R₃ is H a substituted or unsubstituted alkyl group or substituted or a unsubstituted aryl group;

Q₁ and Q₂ each independently represents O, S, —N(R₄) or —C(R₅)₂ where R₄ and R₅ are independently a substituted or unsubstituted alkyl group or a substituted or unsubstituted aryl group, and W represents one or more counterions as needed to balance the charge of the molecule.

3. A photographic element according to claim 2, comprising a film support having on one side thereof a light sensitive layer and on the opposite side thereof a light insensitive layer containing a dye of formula (Ia).

4. A photographic element according to claim 1, wherein the dye of formula (I) is of formula (Ib):

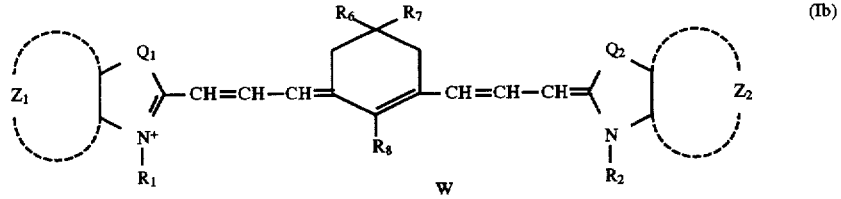

(Ib)

wherein:

Z₁ and Z₂ each independently represents the atoms necessary to form a substituted or unsubstituted benzene group or a substituted or unsubstituted naphthalene group;

R₁ and R₂ each independently represents a substituted or unsubstituted alkyl group or a substituted or unsubstituted aryl group;

R₆, R₇, R₈ each independently represent H, substituted or unsubstituted alkyl or substituted or unsubstituted aryl; and Q₁ and Q₂ independently represent O, S, NR₄ or —C(R₅)₂ where R₄ and R₅ are independently a substituted or unsubstituted alkyl group or a substituted or unsubstituted aryl group, and W represents one or more counterions as necessary to balance the charge of the dye.

5. A photographic element according to claim 4, wherein each of Z₁ and Z₂ is a substituted or unsubstituted benzene group.

6. A photographic element according to claim 4, wherein each of Z₁ and Z₂ is a substituted or unsubstituted naphthalene group.

7. A photographic element according to claim 6, wherein each naphthalene group is substituted with at least one acid group.

8. A photographic element according to claim 7, wherein each naphthalene group is substituted with at least one sulfo group.

9. A photographic element according to claim 4, wherein each of R₁ and R₂ comprises an acid group.

10. A photographic element according to claim 9, wherein each of R₁ and R₂ comprises a sulfo group.

11. A photographic element according to claim 10, wherein each of R₁ and R₂ is a sulfoalkyl group.

12. A photographic element according to claim 4, wherein each of R₆ and R₇ represents an alkyl group.

13. A photographic element according to claim 12, wherein each of R₃ and R₄ is a methyl group.

14. A photographic element according to claim 13, wherein each R₈ is H.

15. A photographic element according to claim 4, wherein the dye has the formula:

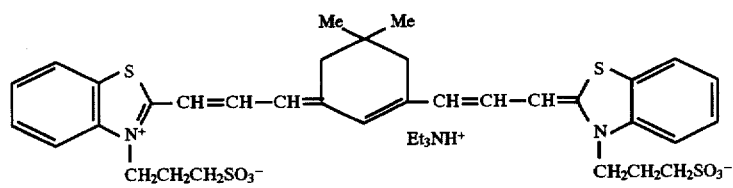

or

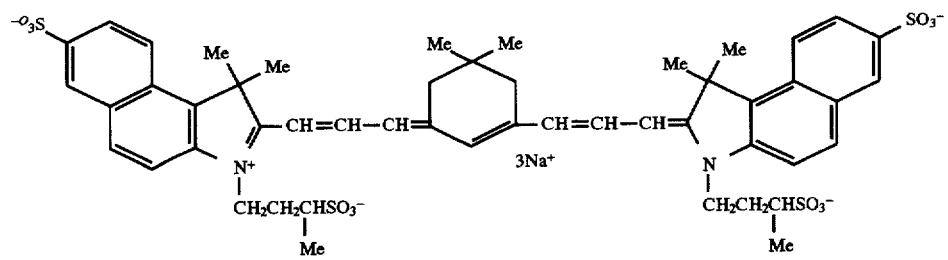

16. A photographic element according to claim 4, comprising a film support having on one side thereof a light sensitive layer and on the opposite side thereof a light insensitive layer containing a dye of formula (Ib).

17. A photographic element according to claim 1, comprising a film support having on one side thereof a light sensitive layer and on the opposite side thereof a light insensitive layer containing a dye of formula (I).

18. A photographic element according to claim 1, wherein the dye contains at least 4 acid groups selected from sulfo, phosphato, and phosphono.

19. A photographic element according to claim 1, wherein W is a monovalent cation.

20. A photographic element according to claim 1, wherein W is sodium, potassium, p-toluene sulfonate or hydrotriethylammonium.

* * * * *